Aug. 12, 1958  J. R. PARKER  2,846,781
COMPONENTS FOR THREE-DIMENSIONAL INDUSTRIAL MODEL
Original Filed Nov. 12, 1954  2 Sheets-Sheet 1
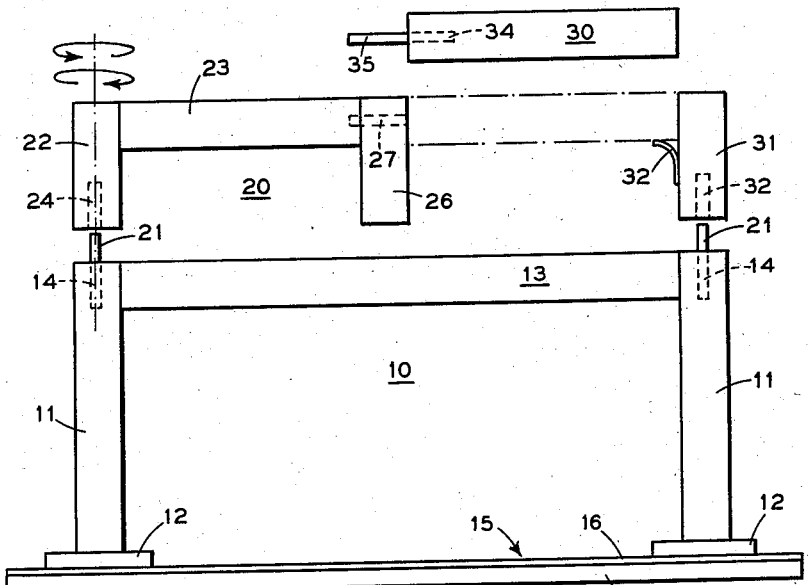
FIG. 1
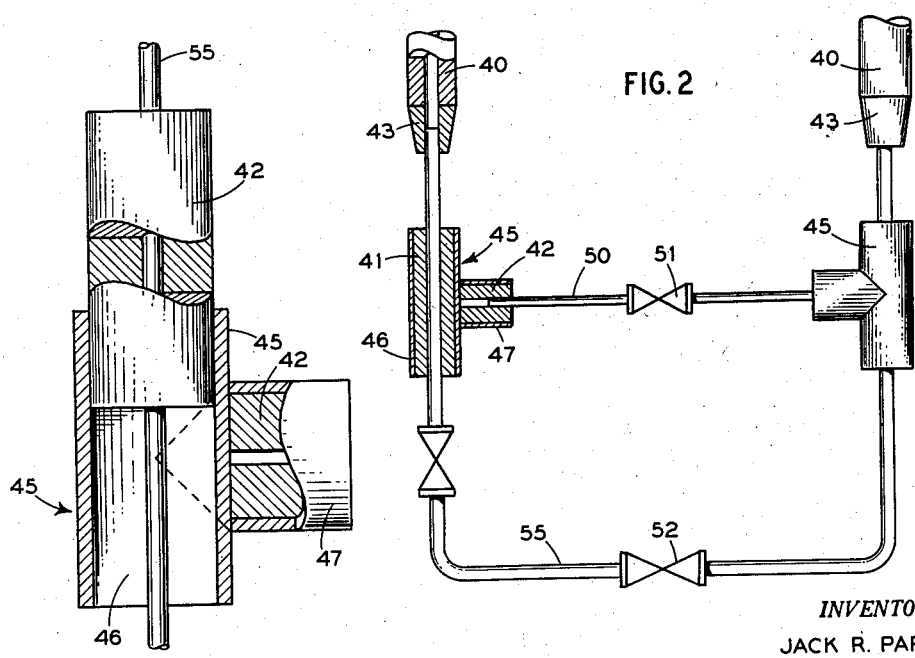
FIG. 2
FIG. 3
INVENTOR.
JACK R. PARKER
BY *Irving Seidman*
ATTORNEY Aug. 12, 1958       J. R. PARKER        2,846,781
COMPONENTS FOR THREE-DIMENSIONAL INDUSTRIAL MODEL
Original Filed Nov. 12, 1954        2 Sheets-Sheet 2

INVENTOR.
JACK R. PARKER
BY
ATTORNEY

United States Patent Office 2,846,781
Patented Aug. 12, 1958

2,846,781

COMPONENTS FOR THREE-DIMENSIONAL INDUSTRIAL MODEL

Jack R. Parker, Malverne, N. Y.

Continuation of application Serial No. 468,340, November 12, 1954. This application May 26, 1955, Serial No. 511,192

3 Claims. (Cl. 35—16)

This invention relates to apparatus for designing an industrial plant layout and, more particularly, to interchangeable components useful in constructing, and modifying during construction, a three-dimensional model of such layout. This application is a continuation of my co-pending application Serial No. 468,340, now Patent No. 2,738,584, filed November 12, 1954.

As described in said co-pending application, the customary way of planning and designing an industrial plant layout, such as a chemical plant or refinery, for example, is to draw scale plans, elevations and sections of each floor on paper. The various items of equipment and their connections, such as fluid lines, piping, wiring, etc. were sketched in tentatively, and then erased or re-drawn as often as necessary to work out their ultimate locations with required clearances and working spaces.

While this procedure is laborious, costly, and time consuming in general, it is particularly so in designing refineries, chemical plants and like apparatus due to the necessity for proper location and orientation of manholes, handholes, valves, etc. for access from working stations.

An improvement on this procedure has been the preparation of scale plans of the various levels or floors and the use of scale plan cutouts or three-dimensional models of the several equipment units. These models are moved around the scale plan drawings until the desired locations and orientations are achieved. The units must then be sketched onto the plan drawings and their connections drawn in. While this has saved some time, it is still costly as accurate scale models of each piece of equipment must be provided for each new layout.

The improved model forming apparatus described in said co-pending application includes a metal plate which is scribed with perpendicularly related longitudinal and lateral lines forming a grid of squares corresponding to the scale of the three-dimensional model. Each of the units or items of equipment to be mounted on the plate has a magnetized base or foundation so that, when positioned on the plate, it will remain in place.

Structural shapes and members are prefabricated to scale of metal or plastic, and joined by dowelled connection pieces to form supports for overhead piping. These shapes and members are provided with magnetized bases for ready adherance to the scaled foundation plate.

The piping used is plastic extrusions, either solid or tubular, in all scale diameters including covering insulation. Connections, such as T's, bends, elbows, loops, etc. are cast or prefabricated from such tubing, and joints are formed by tubular collars receiving the ends of the piping or its connections. The plastic "pipe" can be easily cut or sawed to appropriate lengths, and can be appropriately colored for identification.

In the planning of some types of industrial plants, racks are provided to carry piping of various types, as in oil refineries, chemical plants, and power plants. During the initial stages of design involving the construction of a three-dimensional model of the plant, it may not be known how large these racks should be or whether they should have one or several elevations of piping. The present invention comprises, as one feature, a structural bent or pipe rack model construction by means of which additional elevations may be added at will without any effect on the initial elevation.

One of the greatest disadvantages of conventional model construction is the fact that when it is necessary to install small diameter piping for control stations, bypasses, bleed-off lines, samplers, steam tracing, etc., a considerable amount of soldering must be performed. Wire of copper, brass or other metal is employed. The wire may represent piping having an outside diameter of ¼" O. D. to 1½" O. D., depending upon the thickness and scale used. To insert the proper fittings into the wire, it is necessary to solder each end of the wire to each end of the appropriate fitting. In a model for a large plant, many hundreds of hours are spent in this soldering procedure.

A feature of the invention involves a technique and apparatus for eliminating the necessity for such soldering.

As a further feature, the invention provides novel, interengageable components for simulating air ducts in a three-dimensional industrial model.

For an understanding of the invention principles, reference is made to the following description of typical embodiments of the invention as illustrated in the accompanying drawings. In the drawings:

Fig. 1 is an elevation view of a pipe rack or structural bent incorporating the invention;

Fig. 2 is a plan view of a control piping layout and its connection to main piping;

Fig. 3 is an enlarged plan view, partly in section, of a portion of Fig. 2;

Figure 4:
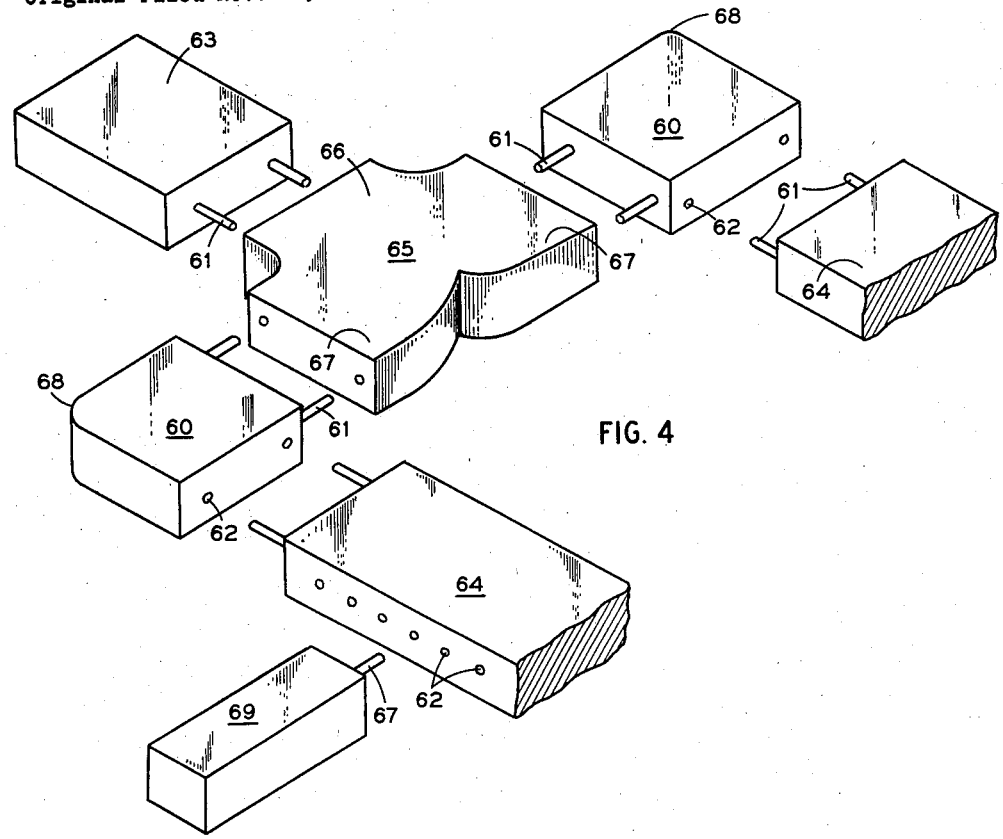
Fig. 4 is an exploded perspective view of an air duct simulating system embodying the invention.

Referring first to Fig. 1 of the drawings, a pipe rack generally illustrated at 10 is indicated as mounted on a paramagnetic support base 15 comprising a sheet 16 of paramagnetic metal secured to a backing sheet 17 of plywood, plastic or the like. As set forth in said co-pending application, sheet 15 may be marked on its upper surface with a grid of intersecting lines perpendicular to each other.

Rack 10 comprises uprights 11 each having a magnetic base 15. Uprights 11 are connected by a cross member or bent 13 which may be connected to uprights 11 by dowels and may also be cemented thereto. If only one elevation of piping is required, rack 10 comprises only the two uprights 11 and cross member 13.

During planning of the industrial plant, utilizing a partly completed three-dimensional model, it often develops that an additional half length or full length rack, at a higher elevation, must be added to the initial rack comprising elements 11, 12 and 13. For this purpose, the upper ends of uprights 11 are formed with central holes 14 receiving dowel pins 21.

Should a second elevation 20 be required for the rack, a short upright or vertical member 22 has a half-length horizontal member 23 cemented thereto flush with its upper end. The lower end of member 22 is drilled or otherwise formed with a central vertical hole 24. The outer or free end of horizontal member 23 has cemented thereto a short upright member 26 substantially equal in length to member 22, and a horizontal hole 27 is drilled through member 26 and centrally into member 23.

This half section 20 is then joined to rack 10 by slipping hole 24 over pin 21, but member 22 is not cemented to member 11 so that rack section 20 may pivot horizontally about pin 21.

Should progress in the planning indicate the necessity for a full length upper rack section, a short upright 31, formed with a central vertical hole 32 and substantially equal in length to members 24 and 26, is mounted on the other upright 11 by slipping pin 21 into hole 32. A support bracket 33 is secured to one side of upright member 31 a short distance from its upper end.

The other half of the upper rack is then completed by forming one end of a horizontal member 30 with a central hole 34 to receive a pin 35. Rack 20 is pivoted around pin 21, and pin 35 is inserted into hole 27 to mount member 30 on rack section 20. The assembly is now swung back into vertical alignment with member 13, with the free end of member 30 engaging upright 31 and resting on bracket shelf or ledge 33.

This procedure may be repeated for further elevations, if required, and when the planning is completed, all the parts are connected in position. The various structural components may be made of wood, rigid plastic, or metal as desired.

Figs. 2 and 3 illustrate the solderless connection of small diameter piping in constructing the model. This small meter piping is simulated by metal wire, such as copper, brass, or other reasonably flexible metal wire. The larger diameter piping 40 is made of solid or tubular form being shown, interconnected by dowel pins inserted in abutting ends. The various sections of piping 40 are interconnected by dowel pins or by fittings such as T's 45 which telescope over piping 40.

To provide solderless connectors between small diameter "piping" wire sections 50 and 55, tubular sleeves 41 and 42 are inserted, respectively, into the heads 46 and stems 47 of T's 45. These sleeves may be made of wood, plastic, or metal, and have lengths equal to the lengths of the heads and stems.

Wire 55 is connected to piping 40 by insertion into reducers 43 on the ends of piping 40, and is also inserted through sleeves 41 in the heads 46 of T's 45. The wire 50, also representing small diameter piping, is inserted into sleeves 42 in stems 47 of T's 45. Model valves 51 and 52 may be formed with "snap on" means, such as curved resilient fingers or arms, for connection to piping 40 or connected thereto by dowel pins.

Figure 5:
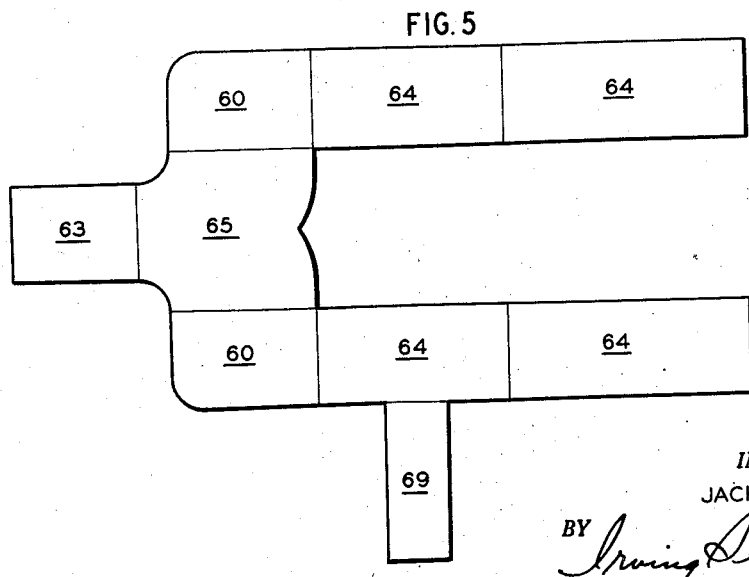
Fig. 5 is a plan view of the system of Fig. 4.

In many cases, it is desired to indicate air ducting for industrial plants such as, for example, air conditioning ducts. Figs. 4 and 5 illustrate three-dimensional model components for readily assembling such ducting in scale form. The several duct sections are made interengageable and interchangeable by the use of dowel pins 61 engageable in holes 62 in the ends or sides of the duct sections. Straight runs of ducts may be formed by interconnecting rectangular blocks of metal, wood, or plastic such as 63 and 64. A block 65, having a stem 66 and arms 67 is utilized to make a T or branch connection, while square blocks 60, having a rounded outer corner 68 are used for corner bends. A branch connection 69 is simulated by a somewhat narrower rectangular block, indicating a smaller duct and disengageably secured to the side edge of straight run element 64 by dowel pins 67 engaged in holes 62 in the ends of element 69 and the side of element 64.

While specific embodiments of the invention have been shown and described in detail to illustrate the application of the invention principles, it will be understood that the invention may be otherwise embodied without departing from such principles.

What is claimed is:

1. For use in a three-dimensional scale model of an industrial plant including piping, a pipe supporting rack assembly comprising a paramagnetic metal foundation plate; a pair of first uprights each having a supporting base of magnetized metal for adherence to said foundation plate, each upright having a central hole in its upper end surface to receive a dowel pin; a first pipe supporting cross member interconnecting the upper ends of said uprights; a second upright member having a central hole in its lower end surface to receive one of said dowel pins to form an extension of one of said first uprights; a second pipe supporting cross member, of less than the length of said first cross member, secured to the upper end of said second upright and projecting laterally therefrom; and a third upright secured to the outer end of said second cross member and extending downwardly therefrom to support the free end of said second cross member on said first member.

2. For use in a three-dimensional scale model of an industrial plant including piping, a pipe supporting rack assembly comprising a paramagnetic metal foundation plate; a pair of first uprights each having a supporting base of magnetized metal for adherence to said foundation plate, each upright having a central hole in its upper end surface to receive a dowel pin; a first pipe supporting cross member interconnecting the upper ends of said uprights; a second upright member having a central hole in its lower end surface to receive one of said dowel pins to form an extension of one of said first uprights; a second pipe supporting cross member, of less than substantially one-half the length of said first cross member, secured to the upper end of said second upright and projecting laterally therefrom; and a third upright secured to the outer end of said second cross member and extending downwardly therefrom to support the free end of said second cross member on said first member.

3. For use in a three-dimensional scale model of an industrial plant including piping, a pipe supporting rack assembly comprising a paramagnetic metal foundation plate; a pair of first uprights each having a supporting base of magnetized metal for adherence to said foundation plate, each upright having a central hole in its upper end surface to receive a dowel pin; a first pipe supporting cross member interconnecting the upper ends of said uprights; a second upright member having a central hole in its lower end surface to receive one of said dowel pins to form an extension of one of said first uprights; a second pipe supporting cross member, of less than substantially one-half the length of said first cross member, secured to the upper end of said second upright and projecting laterally therefrom; a third upright secured to the outer end of said second cross member and extending downwardly therefrom to support the free end of said second cross member on said first member; a fourth upright member having a central hole in its lower end surface to receive the other of said first-named dowel pins to form an extension of the other of said first uprights; said third upright having a hole extending transversely thereof and centrally into said second cross member to receive a second dowel pin; said second and third uprights, interconnected by said second cross member, being pivotal laterally about said first-named dowel pin to receive a third cross member having a central hole in one end to receive said second dowel pin; and a support secured to said fourth upright, adjacent its upper end, to support the free end of said third cross member.

References Cited in the file of this patent

UNITED STATES PATENTS

| | | |
|---|---|---|
| 2,284,458 | Van Antwerp | May 26, 1942 |
| 2,676,420 | Berg | Apr. 27, 1954 |